US010776665B2

(12) United States Patent
Chen et al.

(10) Patent No.: US 10,776,665 B2
(45) Date of Patent: Sep. 15, 2020

(54) SYSTEMS AND METHODS FOR OBJECT DETECTION

(71) Applicant: QUALCOMM Incorporated, San Diego, CA (US)

(72) Inventors: Ching-Hui Chen, San Diego, CA (US); Chinchuan Chiu, Poway, CA (US); Lei Ma, San Diego, CA (US); Shuxue Quan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 15/963,340

(22) Filed: Apr. 26, 2018

(65) Prior Publication Data

US 2019/0332897 A1 Oct. 31, 2019

(51) Int. Cl.
*G06K 9/62* (2006.01)
*G06T 7/20* (2017.01)

(52) U.S. Cl.
CPC .............. *G06K 9/6261* (2013.01); *G06T 7/20* (2013.01); *G06T 2207/20081* (2013.01)

(58) Field of Classification Search
CPC ........ G06K 9/6261; G06T 2207/20081; G06T 7/20
See application file for complete search history.

(56) References Cited

U.S. PATENT DOCUMENTS

| 2004/0239762 | A1* | 12/2004 | Porikli | G06K 9/32 |
| | | | | 348/169 |
| 2013/0170557 | A1* | 7/2013 | Wang | G06T 7/11 |
| | | | | 375/240.24 |
| 2019/0332893 | A1* | 10/2019 | Roy Chowdhury | B60R 1/00 |
| 2019/0370977 | A1* | 12/2019 | Makino | G06T 7/20 |

FOREIGN PATENT DOCUMENTS

| CN | 101299274 A | 11/2008 |
| CN | 103400111 A | 11/2013 |
| CN | 105303581 A | 2/2016 |
| CN | 106469311 A | 3/2017 |
| KR | 101296318 B1 | 8/2013 |

OTHER PUBLICATIONS

Dai J., et al., "R-FCN: Object Detection via Region-based Fully Convolutional Networks," Computer Vision and Pattern Recognition (arXiv:1605.06409v2), Jun. 21, 2016, 11 Pages.

(Continued)

*Primary Examiner* — Nirav G Patel
(74) *Attorney, Agent, or Firm* — QUALCOMM Incorporated

(57) ABSTRACT

A method performed by an electronic device is described. The method includes receiving a set of images. The method also includes determining a motion region and a static region based on the set of images. The method further includes extracting, at a first rate, first features from the motion region. The method additionally includes extracting, at a second rate that is different from the first rate, second features from the static region. The method also includes caching the second features. The method further includes detecting at least one object based on at least a portion of the first features.

26 Claims, 9 Drawing Sheets

(56) References Cited

OTHER PUBLICATIONS

He K., et al., "Mask R-CNN," Computer Vision and Pattern Recognition (arXiv:1703.06870v3), Jan. 24, 2018, pp. 1-12.
Huang J., et al., "Speed/Accuracy Trade-offs for Modern Convolutional Object Detectors", Computer Vision and Pattern Recognition (arXiv:1611.10012v3), Apr. 25, 2017, pp. 1-21.
Ren S., et al., "Faster R-CNN: Towards Real-Time Object Detection with Region Proposal Networks," Computer Vision and Pattern Recognition (arXiv:1506.01497v3) Jan. 6, 2016, pp. 1-14.

* cited by examiner

SYSTEMS AND METHODS FOR OBJECT DETECTION

FIELD OF DISCLOSURE

The present disclosure relates generally to electronic devices. More specifically, the present disclosure relates to systems and methods for object detection.

BACKGROUND

Some electronic devices (e.g., cameras, video camcorders, digital cameras, cellular phones, smart phones, computers, televisions, automobiles, personal cameras, action cameras, surveillance cameras, security cameras, mounted cameras, connected cameras, Internet Protocol (IP) cameras, robots, drones, smart applications, healthcare equipment, set-top boxes, etc.) capture and/or utilize images. For example, a smart phone may capture and/or process still and/or video images. Processing images may demand an amount of time, memory, and energy resources. The resources demanded may vary in accordance with the complexity of the processing.

Interpreting image data may be particularly complex in some cases. For example, interpreting large amounts of image data may demand a large amount of processing resources. As can be observed from this discussion, systems and methods that improve image processing may be beneficial.

SUMMARY

A method performed by an electronic device is described. The method includes receiving a set of images. The method also includes determining a motion region and a static region based on the set of images. The method further includes extracting, at a first rate, first features from the motion region. The method additionally includes extracting, at a second rate that is different from the first rate, second features from the static region. The method also includes caching the second features. The method further includes detecting at least one object based on at least a portion of the first features. Extracting the first features and extracting the second features may be performed on a union of the motion region and one or more regions of interest (ROIs) in the static region. The second rate may be lower than the first rate. The first features and the second features may be cached in a shared feature map.

The method may include detecting movement in the static region. The method may also include retrieving information from a cache in response to the detected movement. The information may include cached features. The method may also include determining a region of interest (ROI) based on the cached features and identifying an object based on the ROI and the cached features. The information may include a label. The method may include presenting the label.

A first operation thread that operates at the first rate may include extracting the first features and detecting the at least one object based on the at least a portion of the first features. A second operation thread that operates at the second rate may include extracting the second features and caching the second features. The second operation thread may further include determining at least one region of interest (ROI) in the static region and detecting at least one object based on at least a portion of the second features in the at least one ROI.

The at least one ROI may include a set of ROIs in the static region. Extracting the second features may include extracting features from at most a subset of the set of ROIs for each image of the set of images.

The method may include classifying the at least one object to produce at least one label. The method may also include presenting the at least one label.

An electronic device is also described. The electronic device includes a processor. The processor is configured to receive a set of images. The processor is also configured to determine a motion region and a static region based on the set of images. The processor is further configured to extract, at a first rate, first features from the motion region. The processor is additionally configured to extract, at a second rate that is different from the first rate, second features from the static region. The processor is also configured to cache the second features. The processor is further configured to detect at least one object based on at least a portion of the first features.

An apparatus is also described. The apparatus includes means for receiving a set of images. The apparatus also includes means for determining a motion region and a static region based on the set of images. The apparatus further includes means for extracting, at a first rate, first features from the motion region. The apparatus additionally includes means for extracting, at a second rate that is different from the first rate, second features from the static region. The apparatus also includes means for caching the second features. The apparatus further includes means for detecting at least one object based on at least a portion of the first features.

A non-transitory tangible computer-readable medium storing computer executable code is also described. The computer-readable medium includes code for causing an electronic device to receive a set of images. The computer-readable medium also includes code for causing the electronic device to determine a motion region and a static region based on the set of images. The computer-readable medium further includes code for causing the electronic device to extract, at a first rate, first features from the motion region. The computer-readable medium additionally includes code for causing the electronic device to extract, at a second rate that is different from the first rate, second features from the static region. The computer-readable medium also includes code for causing the electronic device to cache the second features. The computer-readable medium further includes code for causing the electronic device to detect at least one object based on at least a portion of the first features.

DETAILED DESCRIPTION

Figure 1:
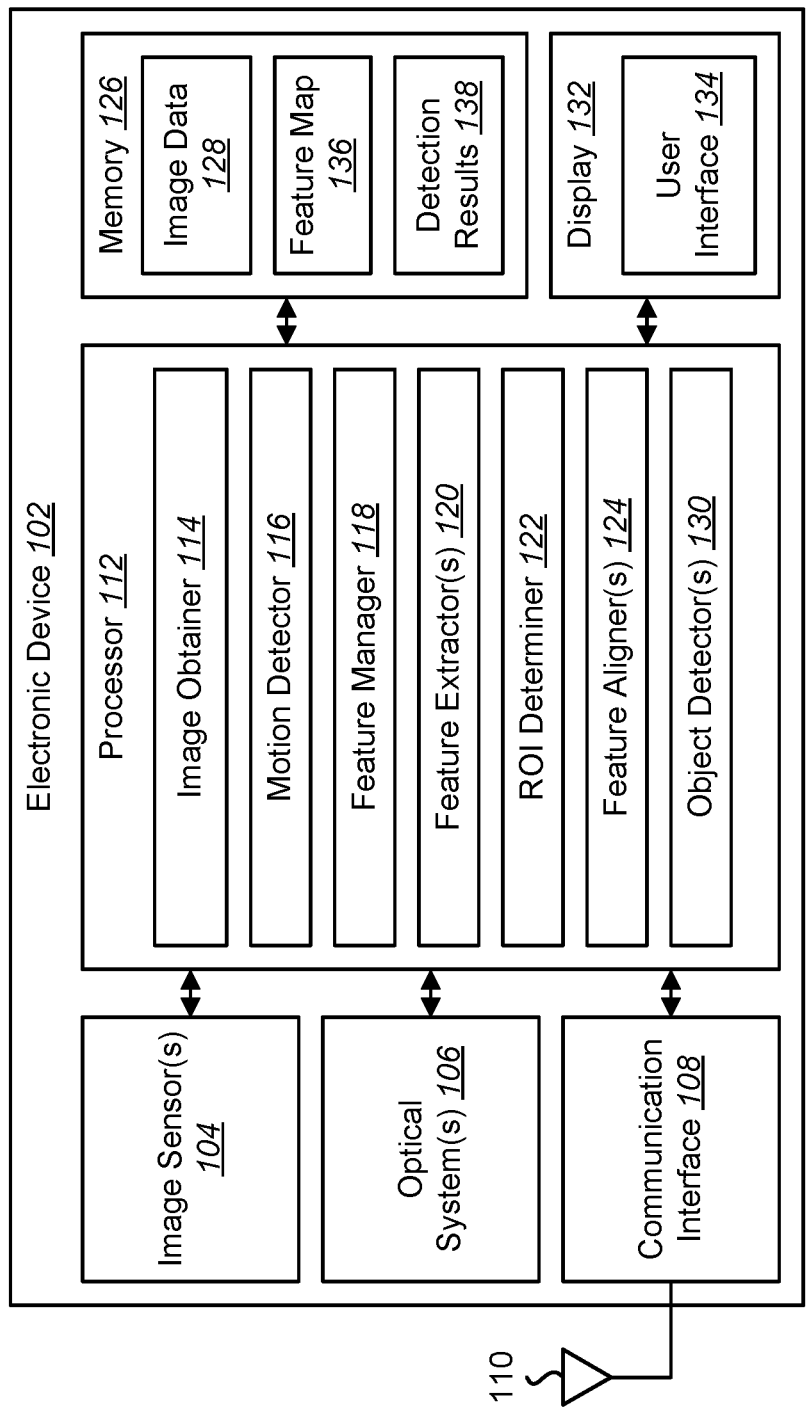
FIG. 1 is a block diagram illustrating one example of an electronic device in which systems and methods for object detection may be implemented.

The systems and methods disclosed herein may relate to object detection. For example, some configurations of the systems and methods disclosed herein may relate to a differential rate (e.g., synchronous/asynchronous) region-based convolutional neural network for object detection.

Some object detection techniques may utilize a region-based convolutional neural network (RCNN) framework to achieve high object detection accuracy. Techniques based on this framework may achieve superior performance because the framework divides the object detection task into a two-stage flow. In a first stage of the network, for example, the feature(s) of the input frame are extracted by a convolutional neural network, and the feature(s) may be sent to a region proposal generator to generate several regions of interest (ROIs), which may be referred to as region proposals. Each ROI and feature map may be sent to the second stage of the network to identify the bounding box and class label of the ROI. These techniques are advantageous in terms of accuracy, but suffer from a high computational requirement.

For example, for a frame of size H×W with N ROIs, the inference time of RCNN object detection is composed of the time for performing convolutional neural network (CNN) feature extraction, region proposal generation, and N feature alignment and detection operations. Hence, the computation complexity can be represented as O(HW)+O(1)+O(N). The use of an RCNN may result in speed and accuracy trade-offs. For example, a higher resolution (larger width (W) and height (H)) input image may provide a better detection accuracy. One of the reasons for this is that a small (or distant) object in the high-resolution image possesses more pixels for helping the object detection task as compared to a low-resolution image. However, the computation requirement grows as the input resolution increases. On the other hand, the number of ROIs plays a significant role in the performance of object detection. The increase of the number of ROIs allows a small and low-confidence object to be better scrutinized in the second part of the network. However, this introduces a linear complexity as the number of ROIs increase. For instance, in the use case of deploying an RCNN object detector for real-time surveillance in a 4K IP camera (H=2160, W=3840, N=300), the computation load may be too large for real-time application on some platforms.

Some configurations of the systems and methods disclosed herein may be implemented for object detection in a fixed field of view (FOV) with a static (e.g., stationary) camera. A static camera may be utilized in a variety of applications, such as video surveillance of a parking lot, street surveillance, and/or home security, etc. Users may be particularly interested in the localization and/or recognition of a moving object.

Some configurations may utilize the fact that most of the regions in the FOV of a static camera may remain static. Accordingly, some configurations may avoid the high computation load of computing the feature of an entire raw frame (e.g., a 3840×2160 video frame) by computing the feature of the motion regions, which may be a typically and relatively small portion of the raw video frame. Some configurations may cache the computed feature and/or detection results of the current frame and/or earlier frames. This may enable utilizing previous computation to extrapolate for future prediction.

Some configurations of the systems and methods disclosed herein may utilize a framework based on a RCNN for object detection. The framework may utilize multiple (e.g., synchronous and asynchronous) threads. For example, the threads may include operations performed at different rates. In some approaches, the feature extraction task of an input frame may be divided into a first (e.g., synchronous) thread and a second (e.g., asynchronous) thread by a feature manager. The feature manager may utilize the output of a motion detector to set the priority of regions for feature computation. For instance, the feature(s) of the motion region(s) may be updated more frequently. It should be noted that the motion detector may be an object tracker, blob tracker, foreground detector, etc., which may output a motion map to indicate a motion region (e.g., part) and/or static region (e.g., part). For example, the motion map may be a binary mask or soft-value mask so that the feature manager can assign the priority based on the motion intensity.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for object detection may be implemented. Examples of the electronic device 102 may include cameras, video camcorders, digital cameras, cellular phones, smart phones, computers (e.g., desktop computers, laptop computers, etc.), tablet devices, media players, televisions, vehicles, automobiles, personal cameras, action cameras, surveillance cameras, security cameras, mounted cameras, connected cameras, IP cameras, robots, aircraft, drones, unmanned aerial vehicles (UAVs), healthcare equipment, gaming consoles, personal digital assistants (PDAs), set-top boxes, etc. The electronic device 102 may include one or more components or elements. One or more of the components or elements may be implemented in hardware (e.g., circuitry), in a combination of hardware and software (e.g., a processor with instructions) and/or in a combination of hardware and firmware.

In some configurations, the electronic device 102 may include a processor 112, a memory 126, a display 132, one or more image sensors 104, one or more optical systems 106, and/or a communication interface 108. The processor 112 may be coupled to (e.g., in electronic communication with) the memory 126, display 132, image sensor(s) 104, optical system(s) 106, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system(s) 106. Additionally or alternatively, the electronic device 102 may or may not include a display 132. Additionally or alternatively, the electronic device 102 may or may not include a communication interface 108.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In some configurations, one or more of the images described herein (e.g., set of image frames, video, etc.) may be presented on the display 132 and/or user interface 134.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

The electronic device 102 (e.g., image obtainer 114) may obtain one or more images (e.g., digital images, image frames, frames, video, etc.). The one or more images (e.g., image frames) may be images of a scene (e.g., one or more objects and/or background). For example, the electronic device 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations.

A camera may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, etc.). In some implementations, the electronic device 102 may include multiple optical system(s) 106 and/or multiple image sensors 104. For example, the electronic device 102 may include multiple wide-angle lenses (e.g., fisheye lenses), multiple "normal" lenses, multiple telephoto lenses, and/or a combination of different kinds of lenses in some configurations. Different lenses may each be paired with separate image sensors 104 in some configurations. Additionally or alternatively, two or more lenses may share the same image sensor 104.

Additionally or alternatively, the electronic device 102 may request and/or receive the one or more images from another device (e.g., one or more external image sensors coupled to the electronic device 102, a network server, traffic camera, drop camera, automobile camera, web camera, smart phone camera, etc.). In some configurations, the electronic device 102 may request and/or receive the one or more images (e.g., image frames) via the communication interface 108. For example, the electronic device 102 may or may not include a camera (e.g., an image sensor 104 and/or optical system 106) and may receive images from one or more remote devices.

The memory 126 may store instructions and/or data. The processor 112 may access (e.g., read from and/or write to) the memory 126. Examples of instructions and/or data that may be stored by the memory 126 may include image data 128 (e.g., one or more sets of image frames, video, etc.), features, feature points, feature vectors, feature map 136 data, detection results 138 data, keypoint data, corner data, image obtainer 114 instructions, motion detector 116 instructions, feature manager 118 instructions, feature extractor(s) 120 instructions, ROI determiner 122 instructions, feature aligner(s) 124 instructions, object detector(s) 130 instructions, and/or instructions for other elements, etc.

In some configurations, the electronic device 102 (e.g., the memory 126) may include an image data buffer (not shown). The image data buffer may buffer (e.g., store) image data 128 (e.g., image frame(s)) from the image sensor 104. The buffered image data may be provided to the processor 112.

In some configurations, the electronic device 102 may include a camera software application and/or a display 132. When the camera application is running, images of scenes and/or objects that are located within the field of view of the optical system(s) 106 may be captured by the image sensor (s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system 106 are presented on the display 132. The one or more images obtained by the electronic device 102 may be one or more video frames, one or more still images, and/or one or more burst frames, etc. It should be noted that some configurations of the systems and methods disclosed herein may utilize a series of image frames (e.g., video).

The processor 112 may include and/or implement an image obtainer 114, a motion detector 116, a feature manager 118, one or more feature extractors 120, a ROI determiner 122, one or more feature aligners 124, and/or one or more object detectors 130. It should be noted that one or more of the elements illustrated in the electronic device 102 and/or processor 112 may not be implemented in some configurations.

In some configurations, one or more of the elements illustrated in the processor 112 may be implemented separately from the processor 112 (e.g., in other circuitry, on another processor, on a separate electronic device, etc.). For example, the image obtainer 114, the motion detector 116, the feature manager 118, the feature extractor(s) 120, the ROI determiner 122, the feature aligner(s) 124, and/or the object detector(s) 130 may be implemented on a separate processor, on multiple processors, and/or a combination of processors.

The processor 112 may include and/or implement an image obtainer 114. One or more images (e.g., image frames, video, burst shots, etc.) may be provided to the image obtainer 114. For example, the image obtainer 114 may obtain (e.g., receive) image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 and/or may be captured from one or more remote camera(s). In some configurations, the image obtainer 114 may request and/or receive the set of images. For example, the image obtainer 114 may request and/or receive one or more images from a remote device (e.g., external camera(s), remote server, remote electronic device, etc.) via the communication interface 108.

In some configurations, the image obtainer 114 may obtain a set of image frames at a frame rate (e.g., frame capture rate). For example, the electronic device 102 may capture the set of image frames at a frame rate or the electronic device 102 may receive a set of image frames that has been captured by another device at a frame rate. The set of images (e.g., video) may include (e.g., depict) one or more objects.

The processor 112 may include and/or implement a motion detector 116 in some configurations. The motion detector 116 may detect motion in one or more images (e.g., frames, video, etc.). For example, the motion detector 116 may detect a motion region. The motion region may include one or more areas of an image where motion is detected. In some approaches, the motion detector 116 may compare images (e.g., frames) to determine the motion region in which the image has changed (to a degree, for example) relative to another image (e.g., previous image, subsequent image, etc.). Examples of the motion detector 116 include an object tracker, blob tracker, foreground detector, etc. The motion detector 116 may produce a motion map. The motion map may indicate the motion region and/or the static region of an image. As described above, the motion map may be a binary mask (where locations with one value indicate motion and locations with another value indicate no motion, for example) or a soft-value mask.

The processor 112 may include and/or implement a feature manager 118. The feature manager 118 may determine and/or maintain a feature map 136. The feature map 136 may indicate one or more features (e.g., one or more feature locations relative to one or more images). For example, the feature map 136 may be stored in a pool of memory 126 that indicates one or more feature locations for one or more images. The feature map 136 may be cached (e.g., stored in memory 126).

The feature manager 118 may manage (e.g., control) feature extraction. For example, the feature manager 118 may control when feature extraction and/or updating are performed for one or more regions (e.g., motion region, static region, and/or one or more ROIs, etc.). In some approaches, the feature manager 118 may control the priority and/or rate of feature extraction for one or more regions. For example, the motion region (e.g., one or more image areas with detected motion) may be given feature extraction and/or update priority over the static region (e.g., one or more ROIs in the static region). For instance, feature extraction may be performed on the motion region (e.g., all motion region areas) for every image (e.g., frame) in a set of images (e.g., frames). In some cases, feature extraction may not be performed for every image in the set of images for the entire static region and/or may not be performed for all ROIs of the static region. For example, the feature manager 118 may amortize feature extraction for the ROIs in the static region (e.g., may spread ROI feature extraction over a number of frames). In some approaches, the feature manager 118 may control feature extraction such that features are extracted from a number of ROIs (e.g., a subset of the ROIs, one ROI, etc.) in the static region for each image (e.g., frame). For example, feature extraction for a set of ROIs in the static region may include extracting features from at most a subset of the set of ROIs for each image. In some cases, feature extraction in the static region (e.g., static region ROIs) may be skipped for one or more images (e.g., frames).

In some configurations, the feature manager 118 may additionally or alternatively control feature extraction based on processing load (e.g., current processing load). For example, as the processing load for the motion region (e.g., motion region feature extraction, motion region object detection, etc.) increases, the feature manager 118 may reduce feature extraction in the static region. For instance, the feature manager 118 may determine the size of the motion region, may determine a number of areas (e.g., bounding boxes) or objects in the motion region, and/or may determine another processing load measure (e.g., a proportion of occupied processing capacity). In some configurations, as the size of the motion region increases, as the number of areas or objects in the motion region increases, and/or as another processing load measure increases, the feature manager 118 may reduce the number of ROIs (per frame, for example) for which feature extraction is performed in the static region and/or may increase a number of skipped frames for which feature extraction is performed in the static region. Additionally or alternatively, as the size of the motion region decreases, as the number of areas or objects in the motion region decreases, and/or as another processing load measure decreases, the feature manager 118 may increase the number of ROIs (per frame, for example) for which feature extraction is performed in the static region and/or may decrease a number of skipped frames for which feature extraction is performed in the static region.

In some approaches, the feature manager 118 may adaptively control the feature extraction using one or more thresholds or functions. For example, when the size of the motion region becomes larger than a threshold, the feature manager 118 may reduce feature extraction for the static region. A series of thresholds may be utilized to progressively reduce and/or increase static region feature extraction based on the size of the motion region, the number of objects or areas in the motion region, and/or another processing load measure. Additionally or alternatively, a function may be utilized that maps an amount of processing load (overall or for the motion region, for example) to an amount of static region feature extraction.

In some configurations, the feature manager 118 may control feature extraction and/or updating based on one or more time stamps. For example, each time features are extracted and/or updated for a region (e.g., ROI in the static region, area of the motion region, etc.), the feature manager 118 may record a time stamp associated with the region. In some configurations, the feature manager 118 may prioritize feature extraction and/or updating for one or more regions with older time stamps. For example, when determining which ROI to update in the static region, the feature manager 118 may prioritize one or more ROIs with older time stamps relative to one or more ROIs with more recent time stamps.

In some configurations, the feature manager 118 may control feature extraction and/or updating based on one or more specified "don't care" regions. For example, the electronic device 102 may receive an input (e.g., user input)

specifying one or more "don't care" regions. In some cases, a "don't care" region may be an area of an image that is unlikely to provide useful information. For example, a very distant part of a scene, a ceiling, or another area of an image may be unlikely to provide useful information. The feature manager 118 may avoid performing feature extraction and/or updating in the one or more "don't care" regions.

The processor 112 may include and/or implement one or more feature extractors 120. The feature extractor(s) 120 may extract features from one or more images (e.g., frames). For example, the feature extractor(s) 120 may determine one or more features such as feature points, keypoints, feature vectors, corners, lines, etc., in one or more regions (e.g., motion region, static region, ROIs, bounding boxes, etc.) of one or more images. In some approaches, determining the one or more features may include searching a region for a structure or pattern (e.g., corner) to determine the features.

The feature extractor(s) 120 may be controlled by the feature manager 118 as described above. For example, the feature manager 118 may control when (e.g., for which image or frame) and/or where (e.g., in which region(s)) the feature extractor(s) 120 are employed to extract and/or update features.

In some configurations, the feature extractor(s) 120 may include a motion region feature extractor (e.g., a synchronous feature extractor) and a static region feature extractor (e.g., an asynchronous feature extractor). The feature manager 118 may control the motion region feature extractor and the static region feature extractor. The motion region feature extractor and the static region feature extractor may be employed at different rates. For example, the motion region feature extractor may extract, at a first rate, features from the motion region. The static region feature extractor may extract, at a second rate, features from the static region (e.g., one or more ROIs in the static region). In some approaches, the features from the motion region may not include features from the static region.

The processor 112 may include and/or implement a ROI determiner 122. The ROI determiner 122 may determine one or more ROIs in one or more images (e.g., frames). For example, the ROI determiner 122 may determine one or more ROIs in the static region and/or in the motion region. For instance, the ROI determiner 122 may determine ROIs that enclose features of one or more potential objects. In some configurations, the ROI determiner 122 may output one or more ROIs regardless of whether the region is static or moving. For example, the ROI determiner 122 may not rely on motion information to propose ROIs. For instance, the ROI determiner 122 may propose an ROI using one or more region proposal networks. In some implementations, a region proposal network may be a full convolutional network. In some approaches, the region proposal network may utilize a sliding window (e.g., a set of windows) of the feature map 136. Each window may be assigned to an intermediate feature, which may be provided to a regression layer and a classification layer of the network. The regression layer may produce a set of region proposals and the classification layer may produce a set of values indicating respective object probabilities (e.g., probability that an object is in a region) for each of the region proposals. It should be noted that in some implementations, the region proposal network may share one or more layers with one or more object detection networks (which may be utilized by the object detector(s) 130).

In some configurations, the processor 112 may include and/or implement one or more feature aligners 124. The feature aligner(s) 124 may align features in one or more regions (e.g., motion region, static region, ROIs, bounding box, etc.). In some configurations, the feature alignment may be implemented by an ROI pooling layer or an ROI align layer. For example, feature alignment may be a conjunction layer between a feature map and a detector to align the feature(s) within an ROI. The feature aligner(s) 124 may take a feature enclosed by ROIs of different size or aspect ratios and produce the same dimension of feature output. Accordingly, the feature aligner(s) 124 may make a feature enclosed by the ROI to be condensed and/or aligned into the same output dimension. The aligned feature may then be used for object detection (e.g., classification and/or localization).

In some configurations, the feature aligner(s) 124 may include a motion region feature aligner (e.g., a synchronous feature aligner) and a static region feature aligner (e.g., an asynchronous feature aligner). The motion region feature aligner and the static region feature aligner may be employed at different rates. For example, the motion region feature aligner may align, at a first rate, features from the motion region (e.g., from one or more areas or bounding boxes of the motion region). The static region feature aligner may align, at a second rate, features from the static region (e.g., from one or more ROIs in the static region).

The processor 112 may include and/or implement one or more object detectors 130. The object detector(s) 130 may detect one or more objects in one or more images. For example, the object detector(s) 130 may search one or more regions (e.g., motion region, static region, ROIs, bounding boxes, etc.) for one or more objects. In some approaches, object detection may be performed based on features. For example, the object detector(s) 130 may utilize a neural network structure to provide the prediction of the object class and location. For instance, a neural network may be trained to classify proposed regions as object types. As described above, the neural network (e.g., convolutional neural network) for object detection (e.g., classification) may share one or more layers with a network for region proposal.

The object detector(s) 130 may produce detection (e.g., identification, classification, etc.) results. In some approaches, the detection results may include a location (e.g., bounding box, ROI, etc.) of a detected object. Additionally or alternatively, the detection results may include a classification or type (e.g., identification) of a detected object. For example, performing object detection may include classifying one or more objects. For instance, each object template may have an associated classification or type. Examples of object classifications include vehicles (e.g., cars, trucks, buses, motorcycles, aircraft, bicycles, scooters, etc.), people, plants, trees, buildings, signs, roads, rocks, clothing, weapons, and other objects. In some approaches, the classification or type of a detected object may be indicated with a label (e.g., a word, character(s), symbol(s), etc.). The detection results 138 may be cached in a cache (in memory 126, for instance). For example, the detection results 138 may include a location (e.g., bounding box, ROI, etc.) for one or more detected objects and/or may include a classification or type (e.g., label) for one or more detected objects. Caching the detection results and/or feature map may be beneficial. For example, having the detection results and/or feature map cached may enable avoiding repeated computation.

In some configurations, detection results may be presented on the display 132. For example, the processor 112 may present a location (e.g., bounding box, ROI, etc.) of the detected object and/or a label (e.g., word(s), character(s), symbol(s), etc.) on the display 132. For example, an image may be presented, where a bounding box is presented around the detected object and a label (e.g., "car," "person," etc.) is presented on the display 132 (e.g., near the corresponding bounding box).

In some configurations, the object detector(s) 130 may include a motion region object detector (e.g., a synchronous object detector) and a static region object detector (e.g., an asynchronous object detector). The motion region object detector and the static region object detector may be employed at different rates. For example, the motion region object detector may detect, at a first rate, one or more objects from the motion region (e.g., from one or more areas or bounding boxes of the motion region). The static region object detector may detect, at a second rate, one or more objects from the static region (e.g., from one or more ROIs in the static region).

In some configurations, the processor 112 may perform one or more operations of a first thread at a first rate and may perform one or more operations of a second thread at a second rate. In some approaches, the first thread may include extracting features from the motion region and detecting one or more objects based on the features. In some approaches, the second thread may include extracting features from the static region (e.g., from one or more ROIs in the static region), caching the features, determining one or more ROIs in the static region, and/or detecting one or more objects in the static region (e.g., in one or more ROIs) based on the features.

In some cases, an object in the static region may begin to move. The motion detector 116 may detect the movement in the static region. In some configurations, the processor 112 (e.g., ROI determiner 122, feature aligner(s) 124, and/or object detector(s) 130) may retrieve information (e.g., feature map 136 data and/or detection results 138 data) from a cache (e.g., memory 126) corresponding to the movement. In some approaches, the information may include cached features corresponding to an area where the movement is detected. The ROI determiner 122 may determine an ROI based on the cached features and/or the object detector(s) 130 may detect an object based on the ROI and/or the cached features. In some approaches, the processor 112 may present the detection results (e.g., bounding box and/or label) corresponding to the object that has begun moving. By retrieving the cached features, the processor 112 may avoid having to extract features again for the object that has begun moving. In some approaches, the retrieved information may include a label and/or an ROI. The processor 112 may directly present the ROI and/or the label.

In some configurations, the processor 112 may determine whether cached detection results are reliable before using the cached detection results (e.g., cached features, cached ROI, and/or cached label). For example, the processor 112 may determine whether motion (e.g., a degree of motion) was detected for a number of frames before the current frame. If little (e.g., less than a threshold) or no motion was detected for the number of frames (e.g., one or more), the cached detection results (e.g., cached features, cached ROI, cached localization bounding box, and/or cached label) may be considered reliable. In some configurations, the cached features may be updated (e.g., consistently updated, regularly updated, etc.) by the feature manager 118.

In some approaches, the reliability determination may be utilized to determine whether a cached ROI and/or label may be utilized, or whether only the cached features may be used (with ROI determination and/or object detection performed again). For example, if a reliability criterion is met (e.g., little or no movement before the current frame), then the ROI and/or label may be presented directly. If the reliability criterion is not met, the cached features may be utilized to re-compute an ROI and/or to perform object detection before presenting the updated detection results. In some configurations, the cached features may be updated (e.g., consistently updated, regularly updated, etc.) by the feature manager 118.

It should be noted that one or more of the elements or components of the electronic device 102 may be combined and/or divided. For example, one or more of the image obtainer 114, the motion detector 116, the feature manager 118, the feature extractor(s) 120, the ROI determiner 122, the feature aligner(s) 124, and/or the object detector(s) 130 may be combined. Additionally or alternatively, one or more of the image obtainer 114, the motion detector 116, the feature manager 118, the feature extractor(s) 120, the ROI determiner 122, the feature aligner(s) 124, and/or the object detector(s) 130 may be divided into elements or components that perform a subset of the operations thereof.

Figure 2:
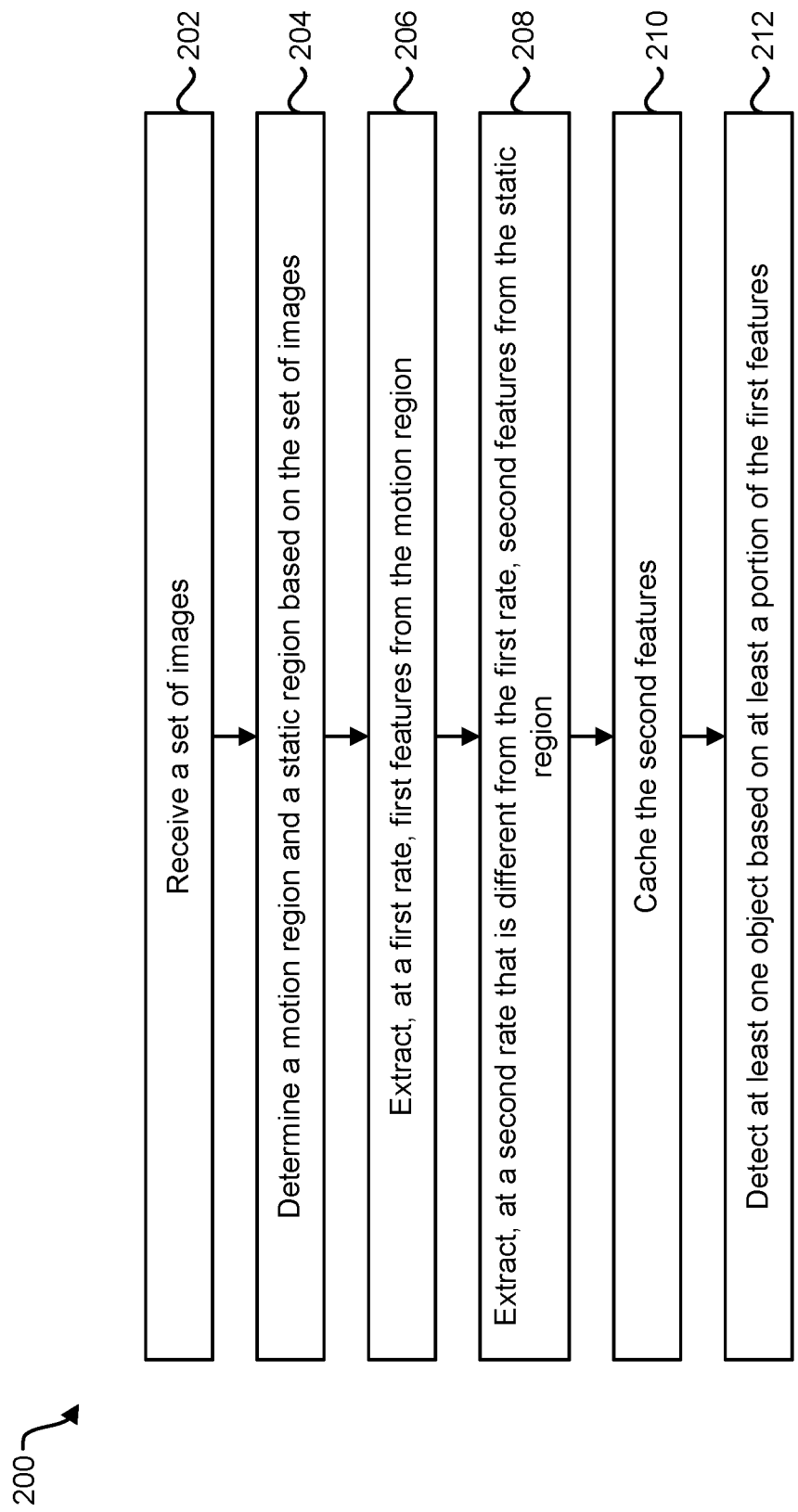
FIG. 2 is a flow diagram illustrating one configuration of a method for object detection.

FIG. 2 is a flow diagram illustrating one configuration of a method 200 for object detection. The method 200 may be performed by the electronic device 102, for example. The electronic device 102 may receive 202 a set of images. This may be accomplished as described in relation to FIG. 1. For example, receiving 202 may include receiving the set of images from an image sensor included in the electronic device 102 or from a remote device (e.g., camera).

The electronic device 102 may determine 204 a motion region and a static region based on the set of images. This may be accomplished as described in relation to FIG. 1. For example, the electronic device 102 may compare images in the set of images (e.g., compare a previous image to a current image, etc.) to determine whether and/or what area (s) of the image indicate motion. One or more areas that indicate a difference (e.g., a threshold difference) may be the motion region, whereas one or more areas that do not indicate a difference (e.g., a threshold difference) may be the static region.

The electronic device 102 may extract 206, at a first rate, first features from the motion region. This may be accomplished as described in relation to FIG. 1. For example, the electronic device 102 may extract features from the motion region (e.g., one or more areas of the motion region). The first rate may be expressed as a frame rate, a frequency, etc. In some approaches, the first rate may correspond to an input frame rate (e.g., 60 frames per second (fps), 30 fps, etc.). For example, features may be extracted 206 from the motion region for every received image or frame. In another example, features may be extracted 206 at a sub-rate of the input frame rate (e.g., once every two frames, once every four frames, etc.).

The electronic device 102 may extract 208, at a second rate that is different frame the first rate, second features from the static region. This may be accomplished as described in relation to FIG. 1. For example, the electronic device 102 may extract features from the static region (e.g., one or more areas of the static region, ROIs, etc.). The second rate may be expressed as a frame rate, a frequency, etc. In some approaches, the second rate may be lower than the first rate. For example, features may be extracted 208 from a subset of the static region for every received image or frame. Accordingly, several images or frames may be processed to extract 208 features from all of the ROIs in the static region. In another example, features may be extracted 208 at a sub-rate of the input frame rate (e.g., once every two frames, once every four frames, etc.). It should be noted that in some approaches, the second rate may be higher than the first rate in some cases. For example, in a case that little or no motion is detected, feature extraction 208 from the motion region may occur at a lower rate than feature extraction 208 in the static region.

The electronic device 102 may cache 210 the second features. This may be accomplished as described in connection with FIG. 1. For example, the electronic device 102 may store and/or update the second features from the static region in a feature map in memory.

The electronic device 102 may detect 212 at least one object based on at least a portion of the first features. This may be accomplished as described in connection with FIG. 1. For example, the electronic device 102 may perform object detection in the motion region based on the extracted first features. In some approaches, different portions of the first features may be utilized to detect objects in different areas of the motion region.

Figure 3:
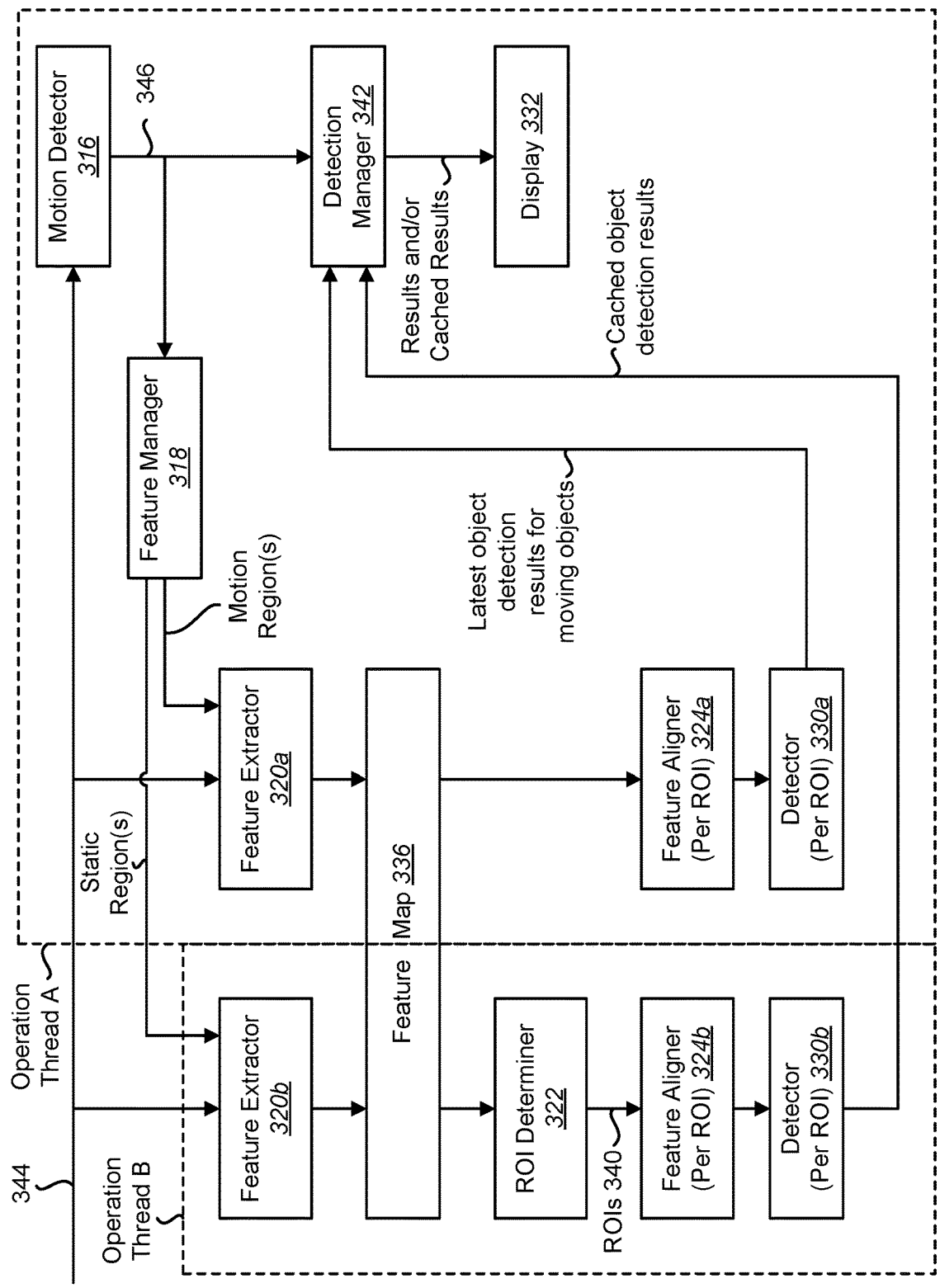
FIG. 3 is a block diagram illustrating an example of object detection in accordance with some configurations of the systems and methods disclosed herein.

FIG. 3 is a block diagram illustrating an example of object detection in accordance with some configurations of the systems and methods disclosed herein. In particular, FIG. 3 illustrates examples of a motion detector 316, feature manager 318, feature extractors 320a-b, a feature map 336, a ROI determiner 322, feature aligners 324a-b, object detectors 330a-b, and a detection manager 342. One or more of the elements described in connection with FIG. 3 may be examples of corresponding elements described in connection with FIG. 1. Additionally or alternatively, one or more of the elements described in connection with FIG. 3 may be implemented in the electronic device 102 described in connection with FIG. 1.

In the example illustrated in FIG. 3, one or more video streams 344 are provided to the motion detector 316 and to the feature extractors 320a-b. The motion detector 316 may determine a motion map 346 or mask (e.g., a motion region and a static region). The motion map 346 may be provided to the feature manager 318 and to the detection manager 342.

The feature manager 318 maintains a cached and shared feature map 336. For example, the cached feature map 336 may be utilized and/or updated based on motion and/or a time stamp. In some configurations, the feature manager 318 may control each of the feature extractors 320a-b to extract features and/or manage updating features. For example, a first feature extractor 320a may extract features from the motion region(s) of the motion mask 346 and/or a second feature extractor 320b may extract features from a static region of the motion mask 346. The extracted features may be stored in a feature map 336. Operation thread A (e.g., a synchronous thread) and operation thread B (e.g., an asynchronous thread) may both access the shared feature map 336. For example, operation thread B may asynchronously access cached features in the feature map 336.

The ROI determiner 322 may determine ROIs 340 based on the feature map 336. For example, the ROI determiner 322 may propose one or more ROIs 340 that may enclose objects using region proposal networks. The ROIs 340 may be provided to a second feature aligner 324b (of operation thread B, for example). In some configurations, the ROIs 340 (e.g., ROIs corresponding to motion regions) may be provided to a first feature aligner 324a (of operation thread A, for example).

The feature aligners 324a-b may align features. In some configurations, feature alignment may be performed as described in connection with FIG. 1. For example, the first feature aligner 324a may perform feature alignment corresponding to the motion region(s) (e.g., ROIs in the motion region(s)). The second feature aligner 324b may perform feature alignment corresponding to the static region(s) (e.g., ROIs in the static region(s)).

The detectors 330a-b may detect one or more objects. In some configurations, object detection may be performed as described in connection with FIG. 1. For example, the first detector 330a may perform object detection corresponding to the motion region(s) (e.g., ROIs in the motion region(s)). The second detector 330b may perform object detection corresponding to the static region(s) (e.g., ROIs in the static region(s)). Detection results from the second object detector 330b may be cached. The object detection results from the detectors 330a-b may be provided to the detection manager 342.

In some approaches, the feature manager 318 may update the features in accordance with one or more rules. One rule may prioritize feature updates for the motion region over feature updates for the static region. Another rule may prioritize one or more regions with older time stamps over one or more regions with newer time stamps. Yet another rule may avoid feature updates for one or more user-specified "don't care" regions.

As illustrated in FIG. 3, operations may be organized into operation thread A and operation thread B. In some configurations, operation thread A may be considered a synchronous operation thread and operation thread B may be considered an asynchronous operation thread. The functions included in operation thread A may be performed at a different rate than the functions included in operation thread B.

In some configurations, a spatially and/or temporally asynchronous updating scheme may be utilized for the feature update in operation thread B. The feature extractor 320b in operation thread B may extract features from the static region of the motion map 346 to update the feature map 336. Instead of updating the feature map 336 of an entire frame at once, several disjoint regions (e.g., ROIs 340) may be updated in a round-robin fashion across several frames. The computation load may be amortized assuming the background remains static for a number of (e.g., two or more) frames.

In some configurations, both operation threads may operate on a shared feature map 336 in memory. One advantage to a shared feature map may be avoiding duplicated computation of features when ROIs 340 overlap. This property may be inherited from the RCNN approach. For instance, if a first ROI is a sub-region of a second ROI at the current time stamp, only the feature located at the second ROI may need to be computed, as the feature of the first ROI may be computed by (e.g., included in) the second ROI.

Some configurations of the systems and methods disclosed herein may significantly reduce the computation complexity of a RCNN object detector by utilizing different operation threads (e.g., synchronous and asynchronous threads). For example, the computation complexity of a RCNN without different operation threads may be expressed as $O(HW)+O(1)+O(N)$, where H denotes image height, W denotes image width, and N denotes a number of ROIs.

When the different operation threads are implemented, the computation complexity (average case) may be expressed as $O(1)+O(1)+O(1)$. For example, operation thread A (e.g., a synchronous thread) complexity may be expressed as $O(N'$ $H'$ $W')+O(1)+O(N')$, where N' is the number of ROIs in the motion region, H' is the height of the ROIs in the motion region, and W' is the width of the ROIs in the motion. Operation thread B (e.g., an asynchronous thread) complexity may be expressed as $O(HW)+O(1)+O(N)$. The RCNN operations may be amortized into constant time O(1) across several frames. The overall (average case) complexity may accordingly be expressed as O(N' H' W')+O(1)+O(N')≈O(1)+O(1)+O(1). The assumptions of the average case are given as follows. First, the motion ROIs (N') is much less than the number of ROIs (N) generated by a region proposal generator (e.g., ROI determiner), i.e., N'<<N. Second, the size of each motion ROI has a relatively small size of ROI with respect to the entire frame, i.e., H'<<H, and W'<<W. Third, most of the regions in the input frame remain static. The motion region only occupies a relatively small portion of the input frame. Hence, it can be expected that the overall complexity may achieve constant time as compared a RCNN implementation without different threads.

Utilizing the cached feature map and detection results may be beneficial by increasing efficiency (e.g., reducing computation complexity and time delay). In some configurations, the cached feature map 336 may be manipulated, interpolated, extrapolated, and/or filtered. Additionally or alternatively, the context of the cached feature map and detection results may be utilized. For example, some approaches may utilize the temporally and spatially correlated nature of the video stream, which may not be well-exploited in a single-frame-based RCNN.

Figure 5:
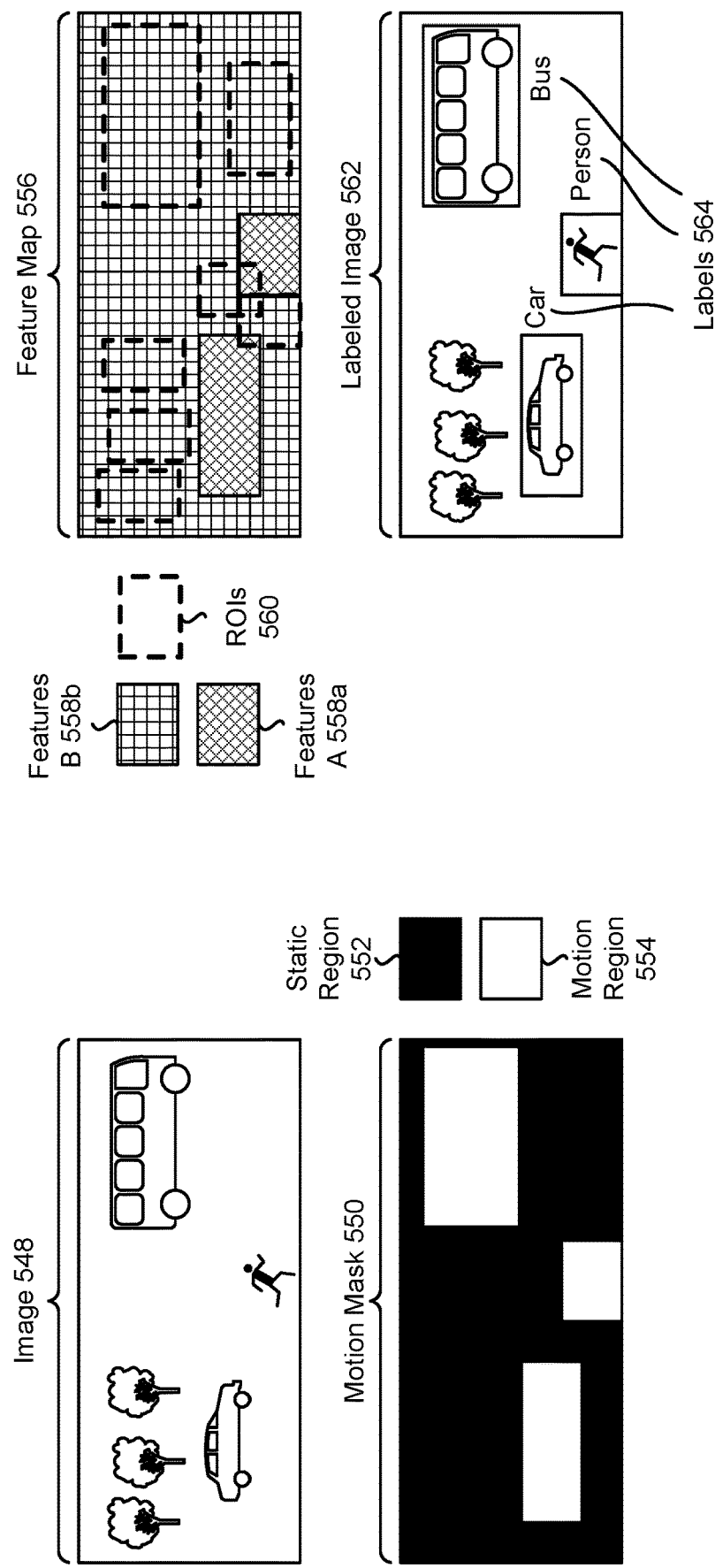
FIG. 5 is a diagram illustrating another example of object detection in accordance with some configurations of the systems and methods disclosed herein.
Figure 6:
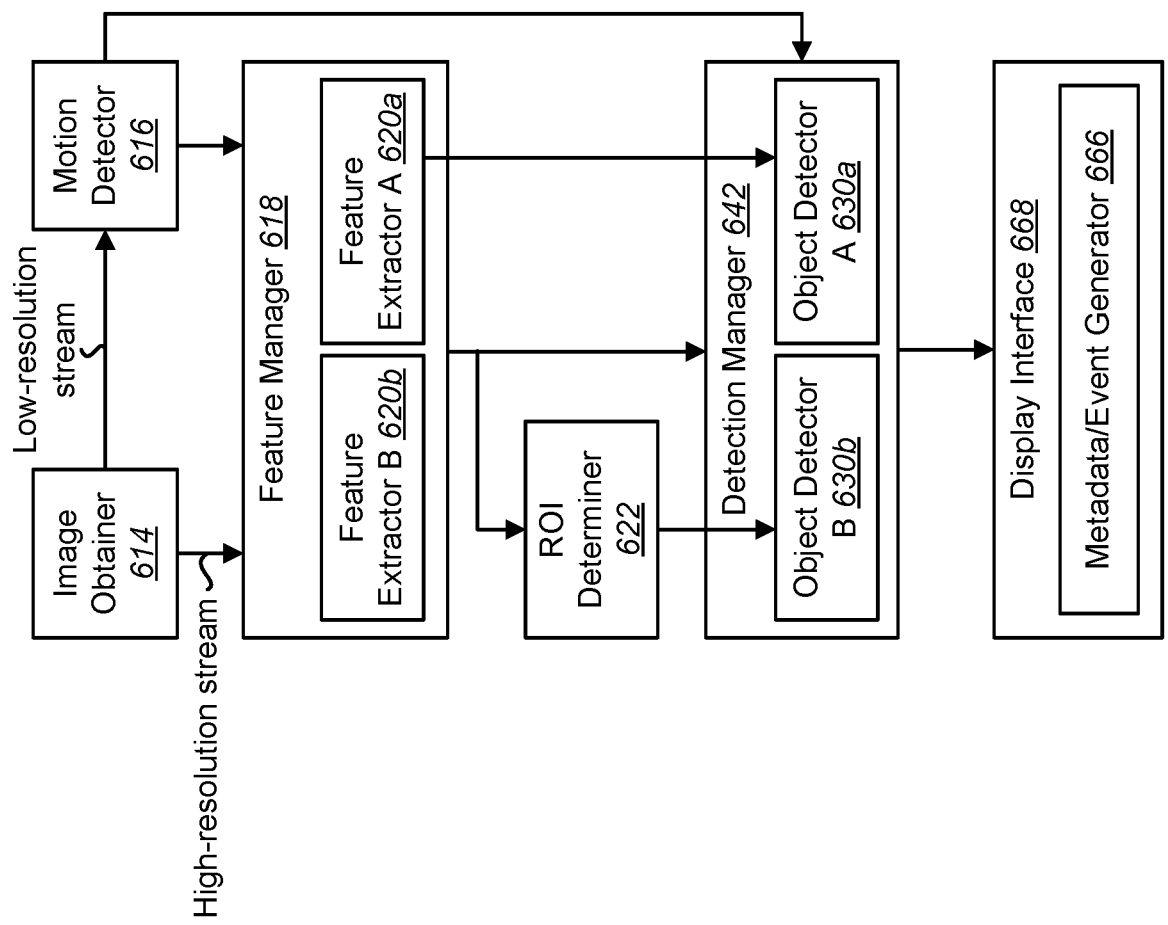
FIG. 6 is a block diagram illustrating an example of elements that may be implemented in accordance with some configurations of the systems and methods disclosed herein.

The detection manager 342 may control the display of object detection results (to end users, for example) by fusing the object detection results from the operation threads (e.g., synchronous and asynchronous threads). In some configurations, the detection manager 342 reduces the latency of reporting a static-to-motion object (e.g., the bounding box and class label of a static-to-moving object), since the cached detection results may be directly transferred to a display stage (e.g., the display 332) when the object starts moving. Some configurations of the systems and methods disclosed herein are capable of detecting both static and moving objects. In some approaches, moving objects may be served with a higher priority to satisfy a time-sensitive quality of service. FIGS. 5-6 illustrate an example of reporting the detection (e.g., recognition) and localization of a static (non-moving) bus that begins to move based on the cached results from an earlier frame.

Figure 4:
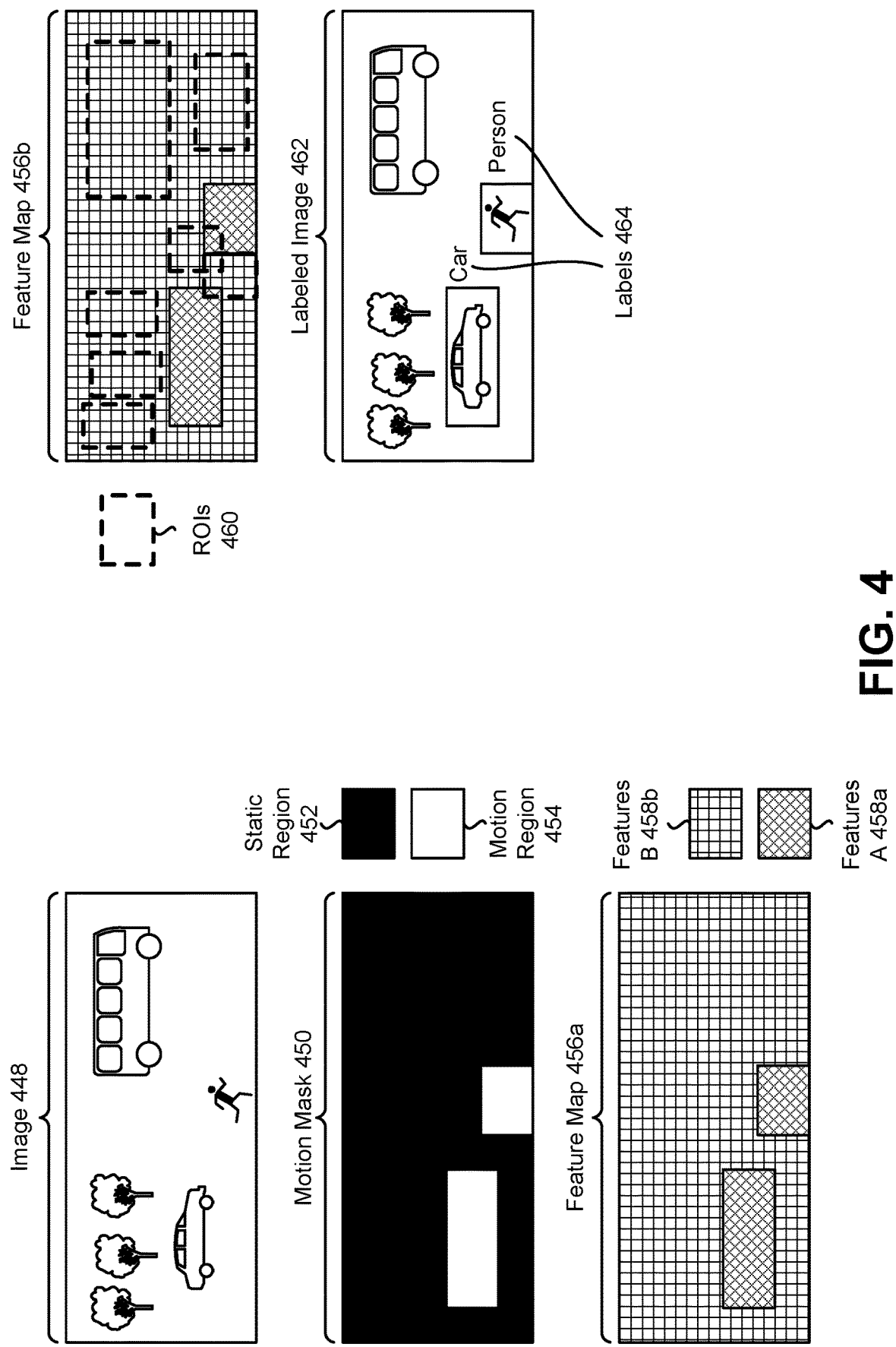
FIG. 4 is a diagram illustrating an example of object detection in accordance with some configurations of the systems and methods disclosed herein.

FIG. 4 is a diagram illustrating an example of object detection in accordance with some configurations of the systems and methods disclosed herein. For instance, the electronic device 102 may operate in accordance with the example of FIG. 4 in some configurations. In this example, an image 448 is received, where the image 448 includes some trees, a car, a bus, and a person. The car and person are in motion. The bus and the trees are static (e.g., not moving initially).

A motion mask 450 may be determined. The motion mask 450 may be an example of the motion map described herein. The motion mask 450 may be a binary motion mask that indicates a motion region 454 and a static region 452. As can be observed, the motion region corresponds to the car and the person of the image 448.

Features may be extracted to produce a feature map 456a. The feature map 456a includes features A 458a corresponding to the motion region 454 and features B 458b corresponding to the static region 452. A number of ROIs 460 may be determined. In some configurations, areas corresponding to of the motion region 454 may also be ROIs. The ROIs 460 are illustrated relative to the feature map 456b.

In the example of FIG. 4, a labeled image 462 may be produced. In some approaches, only moving objects may be indicated to a user (e.g., annotated). For example, ROIs or bounding boxes corresponding to the motion region may be presented. Additionally or alternatively, labels 464 corresponding to detected moving objects may also be presented. In the example of FIG. 4, the car and the person are indicated. Detection results for the trees and bus may be cached.

FIG. 5 is a diagram illustrating another example of object detection in accordance with some configurations of the systems and methods disclosed herein. For instance, the electronic device 102 may operate in accordance with the example of FIG. 5 in some configurations. In this example, an image 548 is received, where the image 548 includes some trees, a car, a bus, and a person. The car, the person, and the bus are in motion. The image 548 may be received after the image 448 described in connection with FIG. 4.

A motion mask 550 may be determined. The motion mask 550 may be a binary motion mask that indicates a motion region 554 and a static region 552. As can be observed, the motion region corresponds to the car, the person, and the bus of the image 548.

In this example, the feature map 556 may include the cached features A 558a and cached features B 558b. ROIs 560 may also be cached in relation to the feature map 556.

In the example of FIG. 5, a labeled image 562 may be produced. In some approaches, only moving objects may be indicated to a user (e.g., annotated). For example, ROIs or bounding boxes corresponding to the moving objects may be presented. Additionally or alternatively, labels 564 corresponding to moving objects may also be presented. In the example of FIG. 5, the car, the person, and the bus are indicated. For example, when the bus starts moving, the detection manager may transfer the bus label from cached results to a display for presentation (e.g., reporting). This approach avoids the latency of updating the feature. Results for the trees may remain in the cache. In some approaches, when the bus starts moving, the cached recognition and localization results for the bus may be directly presented to avoid the latency of performing RCNN detection on the bus's ROI.

FIG. 6 is a block diagram illustrating an example of elements that may be implemented in accordance with some configurations of the systems and methods disclosed herein. For example, a processor (e.g., processor 112 described in connection with FIG. 1) may include and/or implement one or more of the elements described in connection with FIG. 6. One or more of the elements described in connection with FIG. 6 may be examples of corresponding elements described in connection with one or more of FIGS. 1 and 3.

In particular, FIG. 6 illustrates an image obtainer 614, a motion detector 616, a feature manager 618, an ROI determiner 622, a detection manager 642, and a display interface 668. In this example, the image obtainer 614 provides a low-resolution stream to the motion detector 616 and a high-resolution stream to the feature manager 618. For instance, a video stream at a first resolution may be provided to the motion detector 616 and the video stream at a second resolution may be provided to the feature manager 618, where the first resolution is lower than the second resolution.

The motion detector 616 may detect motion in the low-resolution stream as described in connection with one or more of FIGS. 1-3. The motion detector 616 may produce a motion map or mask, which may be provided to the feature manager 618. In this example, feature extractor A 620a (e.g., a synchronous feature extractor) and feature extractor B 620b (e.g., an asynchronous feature extractor) may be included in the feature manager 618. Feature extractor A 620a may perform feature extraction as described in connection with the feature extractor 320a of operation thread A described in connection with FIG. 3. Feature extractor B 620b may perform feature extraction as described in connection with the feature extractor 320b of operation thread B described in connection with FIG. 3. The extracted features may be stored in a feature map (e.g., a shared feature map), which may be provided to the ROI determiner 622 and to the detection manager 642. The ROI determiner 622 may determine one or more ROIs based on the feature map. The ROI(s) may be provided to the detection manager 642 (e.g., object detector B 630b).

In the example shown in FIG. 6, object detector A 630a (e.g., a synchronous object detector) and object detector B 630b (e.g., an asynchronous object detector) may be included in the detection manager 642. Object detector B 630b may detect one or more objects based on the ROI(s) and the feature map. Object detector A 630a may detect one or more objects based on the features from feature extractor A 620a (and/or the motion region(s) provided by the motion detector 616). Detected object results may be provided to the display interface 668.

The display interface 668 may manage showing activities of video analysis results, such as object detection and/or tracking (e.g., human tracking), etc. For example, the display interface 668 may be an interface to display the event information and/or metadata to users. The display interface 668 may include a metadata/event generator 666. The metadata/event generator 666 may log detection and/or tracking results (e.g., label(s), bounding box location(s), width(s), height(s), class prediction probability(ies), and/or decision class(es)) in a database. In some configurations, the database may be stored on an edge device (e.g., wireless communication device) and/or may be sent back to a network (e.g., cloud) server. The display interface 668 may provide metadata and/or events (e.g., label(s), bounding box location(s), width(s), height(s), class prediction probability(ies), and/or decision class(es)) to a display for presentation.

In some configurations, one or more functions (e.g., feature extraction, ROI determination and/or object detection or classification) may be implemented in one or more neural networks (e.g., a region-based convolutional neural network (RCNN)). For example, one or more layers may be shared for ROI determination and classification. In the context of FIG. 6, the RCNN may function in accordance with the motion region(s) and/or static region(s) as described herein. This may avoid repeatedly computing the entire feature map for each incoming video frame for an object detection task, which may not be feasible to meet real-time processing of a 4K video use case.

Figure 7:
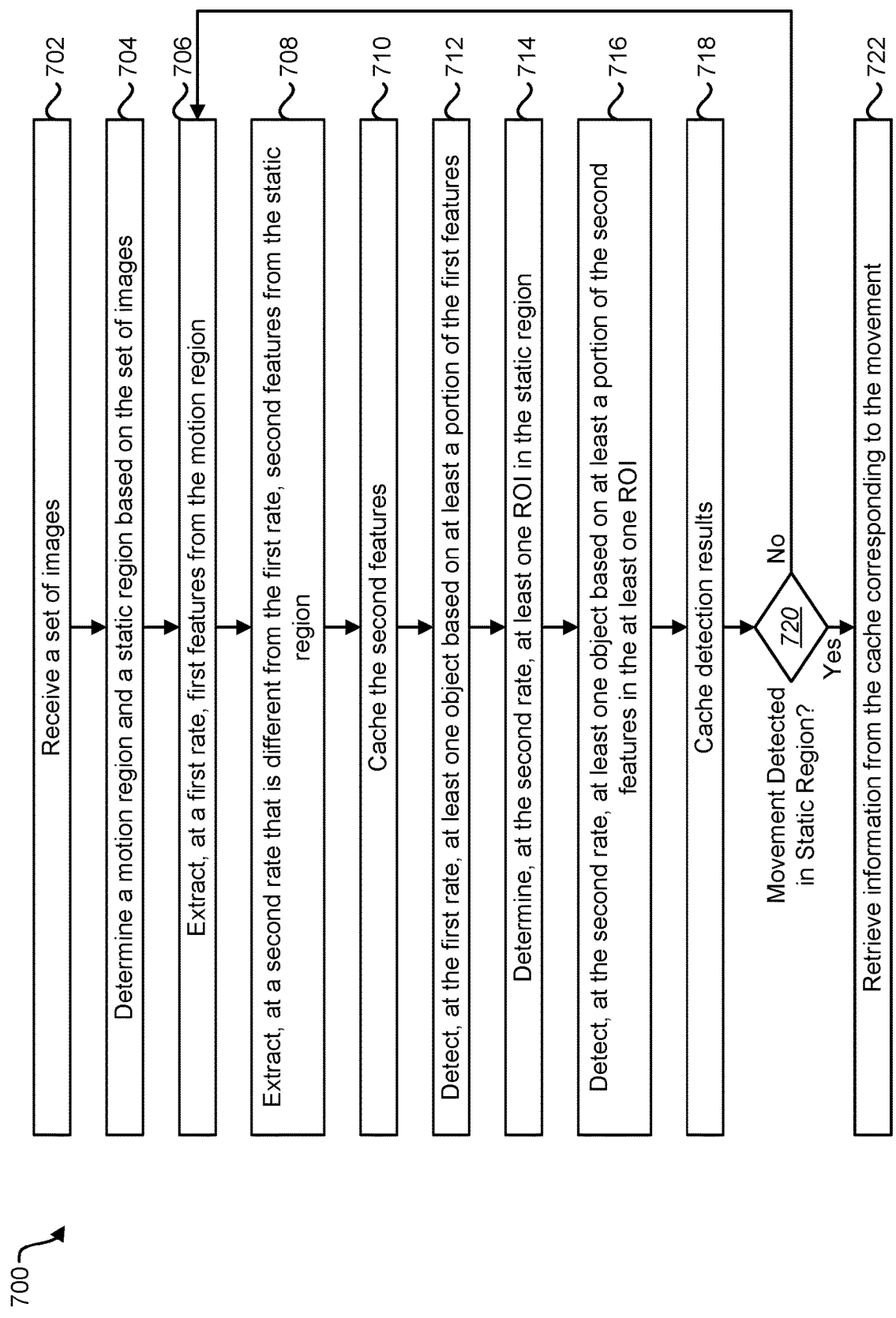
FIG. 7 is a flow diagram illustrating a more specific configuration of a method for object detection.

FIG. 7 is a flow diagram illustrating a more specific configuration of a method 700 for object detection. The method 700 may be performed by the electronic device 102, for example. The electronic device 102 may receive 702 a set of images. This may be accomplished as described in relation to one or more of FIGS. 1-2.

The electronic device 102 may determine 704 a motion region and a static region based on the set of images. This may be accomplished as described in relation to one or more of FIGS. 1-2.

The electronic device 102 may extract 706, at a first rate, first features from the motion region. This may be accomplished as described in relation to one or more of FIGS. 1-2.

The electronic device 102 may extract 708, at a second rate that is different frame the first rate, second features from the static region. This may be accomplished as described in relation to one or more of FIGS. 1-2.

The electronic device 102 may cache 710 the second features. This may be accomplished as described in connection with FIG. 1.

The electronic device 102 may detect 712, at the first rate, at least one object based on at least a portion of the first features. This may be accomplished as described in connection with one or more of FIGS. 1-2.

The electronic device 102 may determine 714, at the second rate, at least one ROI in the static region. This may be accomplished as described in connection with FIG. 1.

The electronic device 102 may detect 716, at the second rate, at least one object based on at least a portion of the second features in the at least one ROI. This may be accomplished as described in connection with FIG. 1. For example, the electronic device 102 may perform detection on a subset of ROIs in the static region over the set of images.

The electronic device 102 may cache 718 detection results. This may be accomplished as described in connection with FIG. 1. For example, the electronic device 102 may store ROIs, bounding boxes, and/or labels corresponding to detected objects in memory.

The electronic device 102 may determine 720 whether movement is detected in the static region. This may be accomplished as described in connection with FIG. 1. For example, the electronic device 102 may determine whether movement is occurring in all or part of the (previous) static region. For example, the electronic device 102 may compare a previous motion map to a current motion map and determine whether motion is detected in the static region of the previous motion map. In a case that movement is not detected in the static region, operation may continue to update feature extraction in the motion region and/or static region, and/or to perform object detection in the motion region and/or static region.

In a case that movement is detected in the static region, the electronic device 102 may retrieve 722 information from the cache corresponding to the movement. This may be accomplished as described in connection with FIG. 1. For example, the electronic device 102 may retrieve cached features, ROIs, bounding boxes, and/or labels from memory. Retrieving 722 the information from the cache may be performed in response to detecting the movement in the static region.

Figure 8:
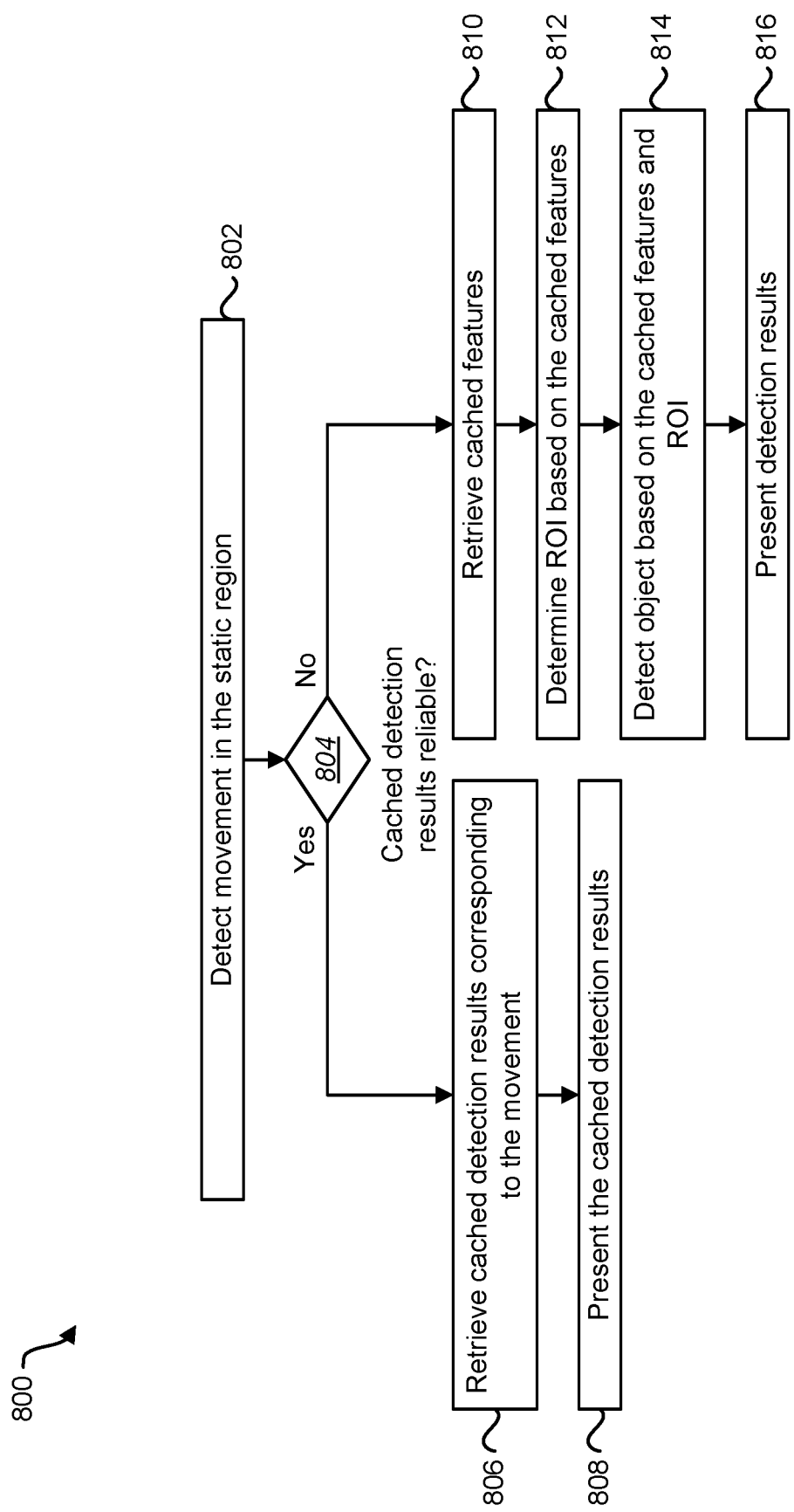
FIG. 8 is a flow diagram illustrating a configuration of a method 800 for presenting detection results.

FIG. 8 is a flow diagram illustrating a configuration of a method 800 for presenting detection results. The method 800 may be performed by an electronic device (e.g., the electronic device 102 described in connection with FIG. 1). In particular, the method 800 illustrates one example of a case in which movement is detected in a static region.

The electronic device 102 may detect 802 movement in the static region. This may be accomplished as described in connection with FIG. 1 or FIG. 7.

The electronic device 102 may determine 804 whether cached detection results are reliable. This may be accomplished as described in connection with FIG. 1. For example, the electronic device 102 may determine whether more than a threshold amount of movement occurred in one or more previous frames. If more than the threshold amount of movement has occurred, the cached detection results may be considered unreliable. Otherwise, the cached detection results may be considered reliable.

In a case that the cached detection results are determined to be reliable, the electronic device 102 may retrieve 806 cached detection results corresponding to the movement. This may be accomplished as described in connection with FIG. 1. For example, the electronic device 102 may retrieve an ROI and/or label corresponding to the area of movement.

The electronic device 102 may present 808 the cached detection results. For example, the electronic device 102 may present the ROI and/or label on a display in association with the detected object in an image.

In a case that the cached detection results are determined to be unreliable, the electronic device 102 may retrieve 810 cached features. This may be accomplished as described in connection with FIG. 1. For example, the electronic device 102 may retrieve features in the cached feature map corresponding to an area of the movement.

The electronic device 102 may determine 812 an ROI based on the cached features. This may be accomplished as described in connection with FIG. 1.

The electronic device 102 may detect 814 an object based on the cached features and the ROI. This may be accomplished as described in connection with FIG. 1. For example, the electronic device 102 may perform object detection (e.g., identification) within the ROI based on the cached features. Detecting 814 an object may produce detection results (e.g., ROI and/or label).

The electronic device 102 may present 816 the detection results. This may be accomplished as described in connection with FIG. 1. For example, the electronic device 102 may present the ROI and/or label on a display in association with the detected object in an image.

Figure 9:
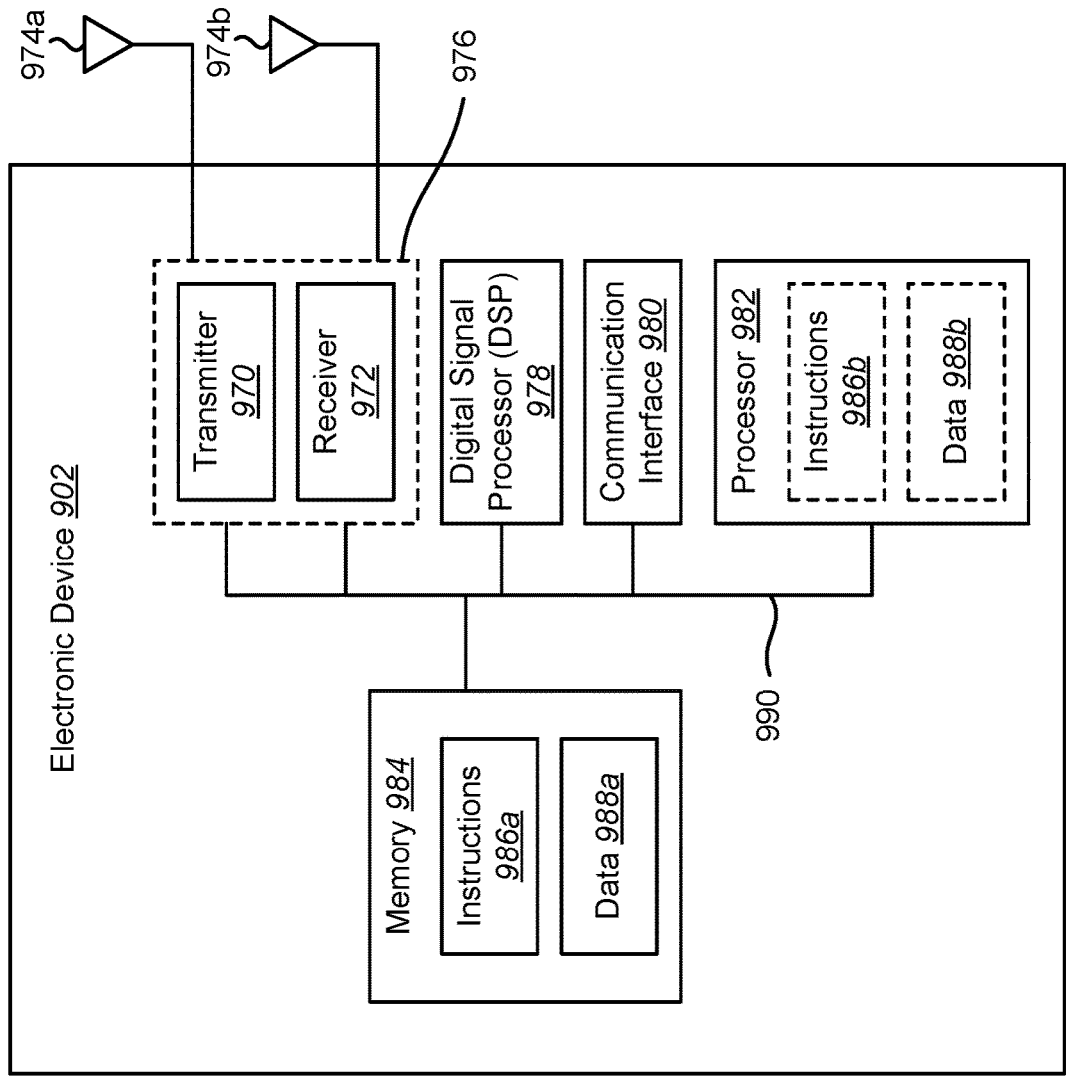
FIG. 9 illustrates certain components that may be included within an electronic device.

FIG. 9 illustrates certain components that may be included within an electronic device 902. The electronic device 902 may be an example of and/or may be implemented in accordance with the electronic device 102 described in connection with FIG. 1. The electronic device 902 may be (or may be included within) a camera, video camcorder, digital camera, cellular phone, smart phone, computer (e.g., desktop computer, laptop computer, etc.), tablet device, media player, television, vehicle, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 902 includes a processor 982. The processor 982 may be a general purpose single- or multi-chip microprocessor (e.g., an advanced RISC machine (ARM)), a special purpose microprocessor (e.g., a digital signal processor (DSP)), a microcontroller, a programmable gate array, etc. The processor 982 may be referred to as a central processing unit (CPU). Although just a single processor 982 is shown in the electronic device 902, in an alternative configuration, a combination of processors (e.g., an ARM and DSP) could be used.

The electronic device 902 also includes memory 984. The memory 984 may be any electronic component capable of storing electronic information. The memory 984 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

Data 988a and instructions 986a may be stored in the memory 984. The instructions 986a may be executable by the processor 982 to implement one or more of the methods 200, 700, 800 described herein. Executing the instructions 986a may involve the use of the data 988a that is stored in the memory 984. When the processor 982 executes the instructions 986, various portions of the instructions 986b may be loaded onto the processor 982, and various pieces of data 988b may be loaded onto the processor 982.

The electronic device 902 may also include a transmitter 970 and a receiver 972 to allow transmission and reception of signals to and from the electronic device 902. The transmitter 970 and receiver 972 may be collectively referred to as a transceiver 976. One or multiple antennas 974a-b may be electrically coupled to the transceiver 976. The electronic device 902 may also include (not shown) multiple transmitters, multiple receivers, multiple transceivers, and/or additional antennas.

The electronic device 902 may include a digital signal processor (DSP) 978. The electronic device 902 may also include a communication interface 980. The communication interface 980 may enable one or more kinds of input and/or output. For example, the communication interface 980 may include one or more ports and/or communication devices for linking other devices to the electronic device 902. Additionally or alternatively, the communication interface 980 may include one or more other interfaces (e.g., touchscreen, keypad, keyboard, microphone, camera, etc.). For example, the communication interface 980 may enable a user to interact with the electronic device 902.

The various components of the electronic device 902 may be coupled together by one or more buses, which may include a power bus, a control signal bus, a status signal bus, a data bus, etc. For the sake of clarity, the various buses are illustrated in FIG. 9 as a bus system 990.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method performed by an electronic device, comprising:
   receiving a set of images;
   determining a motion region and a static region based on the set of images;
   extracting, at a first rate, first features from the motion region;
   extracting, at a second rate that is different from the first rate, second features from the static region, wherein extracting the first features and extracting the second features are performed on a union of the motion region and one or more regions of interest (ROIs) in the static region;
   caching the second features; and
   detecting at least one object based on at least a portion of the first features.

2. The method of claim 1, further comprising:
   detecting movement in the static region; and
   retrieving information from a cache in response to the detected movement.

3. The method of claim 2, wherein the information comprises cached features, and wherein the method further comprises:
   determining a region of interest (ROI) based on the cached features; and
   identifying an object based on the ROI and the cached features.

4. The method of claim 2, wherein the information comprises a label, and wherein the method further comprises presenting the label.

5. The method of claim 1, wherein the second rate is lower than the first rate.

6. The method of claim 1, wherein a first operation thread that operates at the first rate comprises extracting the first features and detecting the at least one object based on the at least a portion of the first features, and a second operation thread that operates at the second rate comprises extracting the second features and caching the second features.

7. The method of claim 6, wherein the second operation thread further comprises:
   determining at least one region of interest (ROI) in the static region; and
   detecting at least one object based on at least a portion of the second features in the at least one ROI.

8. The method of claim 7, wherein the at least one ROI comprises a set of ROIs in the static region, and wherein extracting the second features comprises extracting features from at most a subset of the set of ROIs for each image of the set of images.

9. The method of claim 1, wherein the first features and the second features are cached in a shared feature map.

10. The method of claim 1, further comprising:
    classifying the at least one object to produce at least one label; and
    presenting the at least one label.

11. An electronic device, comprising:
    a processor configured to:
    receive a set of images;
    determine a motion region and a static region based on the set of images;
    extract, at a first rate, first features from the motion region;
    extract, at a second rate that is different from the first rate, second features from the static region, wherein extracting the first features and extracting the second features are performed on a union of the motion region and one or more regions of interest (ROIs) in the static region;

cache the second features; and detect at least one object based on at least a portion of the first features.

12. The electronic device of claim 11, wherein the processor is configured to:

detect movement in the static region; and retrieve information from a cache in response to the detected movement.

13. The electronic device of claim 12, wherein the information comprises cached features, and wherein the processor is configured to:

determine a region of interest (ROI) based on the cached features; and identify an object based on the ROI and the cached features.

14. The electronic device of claim 12, wherein the information comprises a label, and wherein the processor is configured to present the label.

15. The electronic device of claim 11, wherein the second rate is lower than the first rate.

16. The electronic device of claim 11, wherein a first operation thread that operates at the first rate comprises extracting the first features and detecting the at least one object based on the at least a portion of the first features, and a second operation thread that operates at the second rate comprises extracting the second features and caching the second features.

17. The electronic device of claim 16, wherein the second operation thread further comprises:

determining at least one region of interest (ROI) in the static region; and detecting at least one object based on at least a portion of the second features in the at least one ROI.

18. The electronic device of claim 17, wherein the at least one ROI comprises a set of ROIs in the static region, and wherein extracting the second features comprises extracting features from at most a subset of the set of ROIs for each image of the set of images.

19. The electronic device of claim 11, wherein the first features and the second features are cached in a shared feature map.

20. The electronic device of claim 11, wherein the processor is configured to:

classify the at least one object to produce at least one label; and present the at least one label.

21. An apparatus, comprising:

means for receiving a set of images;

means for determining a motion region and a static region based on the set of images;

means for extracting, at a first rate, first features from the motion region;

means for extracting, at a second rate that is different from the first rate, second features from the static region, wherein the means for extracting the first features and the means for extracting the second features are based on a union of the motion region and one or more regions of interest (ROIs) in the static region;

means for caching the second features; and means for detecting at least one object based on at least a portion of the first features.

22. The apparatus of claim 21, further comprising:

means for detecting movement in the static region; and means for retrieving information from a cache in response to the detected movement.

23. The apparatus of claim 21, wherein the second rate is lower than the first rate.

24. A non-transitory tangible computer-readable medium storing computer executable code, comprising:

code for causing an electronic device to receive a set of images;

code for causing the electronic device to determine a motion region and a static region based on the set of images;

code for causing the electronic device to extract, at a first rate, first features from the motion region;

code for causing the electronic device to extract, at a second rate that is different from the first rate, second features from the static region, wherein the code for causing the electronic device to extract the first features and the code for causing the electronic device to extract the second features are based on a union of the motion region and one or more regions of interest (ROIs) in the static region;

code for causing the electronic device to cache the second features; and code for causing the electronic device to detect at least one object based on at least a portion of the first features.

25. The computer-readable medium of claim 24, further comprising:

code for causing the electronic device to detect movement in the static region; and code for causing the electronic device to retrieve information from a cache in response to the detected movement.

26. The computer-readable medium of claim 24, wherein the second rate is lower than the first rate.

* * * * *